(12) United States Patent
Keohane et al.

(10) Patent No.: US 7,512,790 B2
(45) Date of Patent: Mar. 31, 2009

(54) METHOD, SYSTEM AND ARTICLE OF MANUFACTURE FOR MANAGEMENT OF CO-REQUISITE FILES IN A DATA PROCESSING SYSTEM USING EXTENDED FILE ATTRIBUTES

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 10/418,545

(22) Filed: Apr. 17, 2003

(65) Prior Publication Data
US 2004/0249822 A1    Dec. 9, 2004

(51) Int. Cl.
*G06F 21/00*    (2006.01)
(52) U.S. Cl. ............................. 713/165; 713/166
(58) Field of Classification Search .................. 713/165, 713/166, 167
See application file for complete search history.

(56) References Cited

U.S. PATENT DOCUMENTS

| | | | | |
|---|---|---|---|---|
| 5,113,519 A | * | 5/1992 | Johnson et al. | 707/201 |
| 5,218,696 A | * | 6/1993 | Baird et al. | 707/1 |
| 5,367,671 A | * | 11/1994 | Feigenbaum et al. | 707/1 |
| 5,603,020 A | * | 2/1997 | Hashimoto et al. | 707/200 |
| 5,615,363 A | * | 3/1997 | Jenness | 707/103 R |
| 5,615,364 A | * | 3/1997 | Marks | 707/202 |
| 5,628,007 A | * | 5/1997 | Nevarez | 707/102 |
| 5,644,736 A | * | 7/1997 | Healy et al. | 715/784 |
| 5,893,086 A | * | 4/1999 | Schmuck et al. | 707/1 |
| 6,038,573 A | * | 3/2000 | Parks | 715/513 |
| 6,549,916 B1 | * | 4/2003 | Sedlar | 707/200 |
| 2002/0107874 A1 | * | 8/2002 | DeLorme et al. | 707/200 |

\* cited by examiner

*Primary Examiner*—Gilberto Barron, Jr.
*Assistant Examiner*—Devin Almeida
(74) *Attorney, Agent, or Firm*—Diana R. Gerhardt; Dillon & Yudell LLP

(57) ABSTRACT

Files, such as HTML files, are managed by performing a permitted command or action initiated on a current file on all its co-requisite files as identified in an extended attribute field stored within the current file. Thus, when an HTML file is emailed or transferred, all requisite files necessary to properly render the web page at the client are assured to be sent. The extended attribute field indicates the parent-child relationship of the co-requisite files and only performs the action on child files. The extended attribute field within the current file also indicates the actions that can be performed on each of its co-requisite files.

14 Claims, 5 Drawing Sheets

METHOD, SYSTEM AND ARTICLE OF MANUFACTURE FOR MANAGEMENT OF CO-REQUISITE FILES IN A DATA PROCESSING SYSTEM USING EXTENDED FILE ATTRIBUTES

TECHNICAL FIELD

This invention relates in general to managing computer files and objects in a computer system, and more particularly relates to management of co-requisite files being manipulated by a computer system.

BACKGROUND

It is common to have digital files stored and used within a computer system that are inter-dependent such that the computer system requires all of the inter-dependent files when implementing a function or executing an operation. Often these various files have different data types or formats that make it cumbersome or impossible to merge into a single file. A prime example of inter-dependent files can be found in the composition of web page files used for viewing content on the Internet, and particularly the World Wide Web, which is the Internet's multimedia information retrieval system.

In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML along with Extended Markup Language ("XML") and others are members of a family of computer languages referred to as "markup languages". Markup languages are computer languages that define the format of a text document in a device-independent way. A primary purpose of a markup language, such as HTML, is to instruct a Web browser how to display the contents of the document, including text, images and other support media.

An "HTML document" is a special type of document that includes HTML codes to permit the document to be viewed using a Web browser program. An HTML document that is accessible on a World Wide Web site is commonly referred to as a "Web document" or "Web page." Web pages commonly include embedded components, such as GIF (Graphics Interchange Format), JPEG (Joint Photographic Experts Group) and BMP (Bit-Mapped Graphics) files, which are represented within the HTML coding as directory paths within the server memory system or as a network path using Uniform Resource Locators (URL) to provide a reference to the required file.

As a result, when an HTML file is to be transferred between storage devices, computers or networks, the co-requisite files referenced within the HTML coding, for example, a graphics image, often must be transported along with the HTML file in order for the Web page to be properly rendered when accessed at its destination. Unfortunately, existing computer systems require the system user to remember or have knowledge of the relationship between the particular HTML file being transferred and its set of co-requisite files so that all files necessary to render the Web page are transferred, moved, copied or emailed to the destination. The problem is further complicated when the co-requisite files may not reside in the same directory as the HTML file. An alternative is to insert URL links into the HTML code so that the Web page is dynamically generated at the destination, which uses the path information identifying the location of the linked page or object to download the image file into the Web page. However, a client may not have an Internet connection to access the URL, the object content may have been moved to a different host server location, or the hosting server may no longer support the object content altogether. Consequently, what is needed is a method and system that automatically transports all co-requisite files when a related file is transported or copied to a different location within a computer or network system.

SUMMARY OF THE INVENTION

In accordance with the present invention, a method, system and program product for managing objects in a data processing system is provided in accordance with the present invention. The objects are managed by accessing one or more extended attribute fields within an object, in response to an action being initiated on the object; determining if any co-requisite objects that are related to the object are identified in an accessed extended attribute field within the object; and performing the action on co-requisite objects identified in the accessed extended attribute field within the object. In an alternative embodiment, the process includes determining if an extended attribute field within the object indicates that the relationship between a co-requisite object identified in the accessed extended attribute field within the object and the object is that of the object as a parent and the co-requisite object as a child to the object; and performing the action on co-requisite objects identified in the accessed extended attribute field within the object as a child to the object. In an alternative embodiment, the process includes, for each co-requisite object identified in the accessed extended attribute field within the object, determining if an extended attribute field within the object indicates that only specified actions can be performed on a co-requisite object identified in the accessed extended attribute field within the object; and performing the action on those co-requisite objects identified in an accessed extended attribute field within the object where an extended attribute field within the object indicates that the action is a specified action that can be performed on the given co-requisite object.

DETAILED DESCRIPTION OF A PREFERRED EMBODIMENT

A computer system can be considered as three major components: (1) the application programs, such as a spreadsheet or word processing or graphics presentation application, which are used by the user; (2) the operating system that transparently manages the application's interactions with other applications and the computer hardware; and (3) the computer hardware comprising the processor, the random access memories, the actual electronic components which manage the digital bits. The operating system has a kernel which, inter alia, controls the execution of applications, processes, and/or objects by allowing their creation, termination or suspension, and communication; schedules processes/objects of the same or different applications on the hardware, allocates memory for those objects, administers free space, controls access to the objects, and retrieves objects and data for the user. The term object is used herein to at least include a named storage space having a set of characteristics that describes itself and, in some cases, includes data. More broadly, an object is anything that exists in and occupies space in storage and on which operations can be performed, for example, programs, files, libraries, directories, and folders.

The system for managing files within the computer system is called the file system. All file systems require the use of an Object Attribute Table (OAT). The OAT stores attribute information for each object linked into the file system. Attributes include information such as time stamps, the number of links, object size, owner identifier, object type, access permissions, etc. Many file systems, for instance that which is part of the UNIX operating system, implement a single OAT, called an inode list in UNIX, for the entire file system. The inode list maintains the state of the file system. Administrators specify the size of the inode list when configuring a file system. In UNIX, the internal representation of a file or object is an inode (a contraction of the term index node). The inode contains a description of the disk layout of the file data and other information, e.g., such as the file owner, access permissions, and access times. Every file has one inode but may have several names all of which map into the inode. When a process refers to a file by name, the kernel parses the file name along its hierarchical path one component at a time, checks that the process has permission to search the directories in the path, and eventually retrieves the inode for the file.

Figure 1:
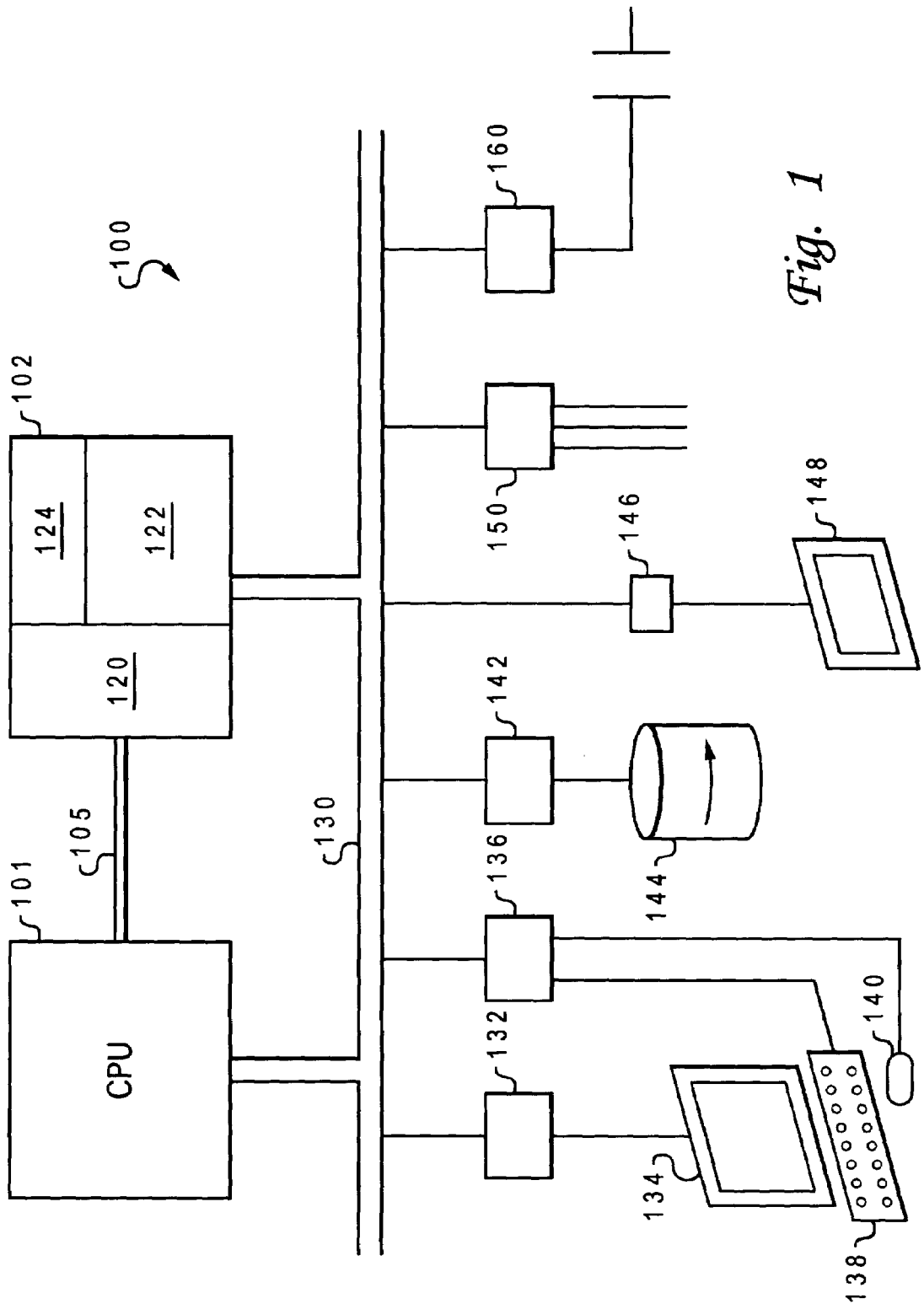
FIG. 1 is a high-level block diagram of a digital processing system, which may be a high-level computer system, capable of implementing the preferred embodiment of the invention.

Referring now to the drawings, wherein like numbers denote like parts throughout the several views, FIG. 1 shows a high-level block diagram of a digital processing system 100, which may be a high-level computer system, consistent with an embodiment of the invention. Digital processing system 100 may comprise central processing unit (CPU) 101, which may be a programmable processor, executing instructions stored in memory 102. While a single CPU is shown in FIG. 1, it should be understood that computer systems having multiple CPUs could be used. Connected to the CPU 101 through an internal bus 105 and/or an external system bus 130 is memory 102. Memory 102 is a random-access semiconductor memory for storing data and programs; thus, the system memory is shown conceptually as a single monolithic entity but it is well known that system memory is often arranged in a hierarchy of caches and other memory devices. Memory 102 contains at least an operating system having a kernel 120 and applications 122. Kernel 120 provides, inter alia, functions such as device interfaces, management of memory pages, management of multiple tasks, etc. as is known in the art. CPU 101 is suitably programmed to execute the kernel 120 and instructions of applications 122 retrieved from memory 102. Memory 102 has the necessary elements to carry out the preferred embodiment by having object attribute tables as described below. Applications 122 may include a server software application, and if so, network interface 160 may interact with the server software application 122 to enable digital processing or computer system 100 to be a network server.

Communication bus 130 supports transfer of data, commands and other information between different devices; while shown in simplified form as a single bus, it may be structured as multiple buses, and may be arranged in a hierarchical form. Display adapter 132 supports video display 134 which may be a cathode-ray tube display, a flat panel display, or a touch panel, although other display technologies may be used. Keyboard/pointer adapter 136 supports keyboard 138 and pointing device 140 depicted as a mouse, it being understood that other forms of input devices could be used. Storage adapter 142 supports one or more data storage devices 144 which may be rotating magnetic hard disk drives or CD-ROM drives although other data storage devices could be used. Printer adapter 146 supports printer 148. Adapter 150 may connect a wide variety of devices to the digital processing or computer system 100 and to other adapters connected to other devices such as, but not limited to, speakers, audio and visual equipment, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Ultra3 SCSI, Infiniband, FDDI, ATM, 1394, ESCON, wireless relays, USB, Twinax, LAN connections, WAN connections, high performance graphics, etc., as is known in the art. Network interface 160 provides a physical interface to a network, such as the Internet. This interface may comprise a modem connected to a telephone line through which an Internet access provider or online service provider is reached, but increasingly other higher bandwidth interfaces are implemented. For example, digital processing or computer system 100 may be connected to another network server via a local area network using an Ethernet, Token Ring, or other protocol, the second network server in turn being connected to the Internet. Alternatively, network interface 160 may be provided through cable television, fiber optics, satellites, wireless, or other connections. The representation of FIG. 1 is intended as an exemplary simplified representation of a high-end server, it being understood that in other digital processing systems 100 variations in system configuration are possible in addition to those mentioned here.

Finally, digital processing system 100 need not be a computer at all, but may be a simpler appliance-like client device, also called an embedded device, having less processing power and memory such as a network terminal, a thin client, a terminal-like device, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smartphones, pagers, simple messaging devices and wearable devices. Thus, when the digital processing system 100 is a mobile or an embedded device, the adapters 150 and network interfaces 160 support a variety of multi-modal interfaces including traditional keyboard and mouse interfaces, small text screens, pen, touch screens, speech recognition, text-to-speech and other emerging technologies like wearable devices. Such special-purpose devices for accessing the world wide web, such as an Internet access box for a television set, or a portable wireless web accessing device, which can implement an adapter for the purpose of communicating data to/from another computer system are also intended to be within the scope of a digital processing system 100.

As will be described in detail below, aspects of the preferred embodiment pertain to a specific method or process having steps implementable on a digital processing system 100. The digital processing system 100 herein has a file system that has sufficient machine functions to implement a user or program interface, and which can maintain directories of objects and attributes of those objects. The file system of the digital processing system 100 utilizes the directories and an Object Attribute Table (OAT) to provide a logical grouping of the computer's files and is manipulated by the user by means of a user interface or a program by means of an application program interface. The code to manipulate the OAT may be part of the kernel or other application. The OAT, its entries, the links, and pointers are all managed by code which interacts integrally with the operating system. In the sense used herein, the term operating system need not be an extensive operating system for a high-end server but may also include a smaller operating system for appliance-like devices.

Figure 2:
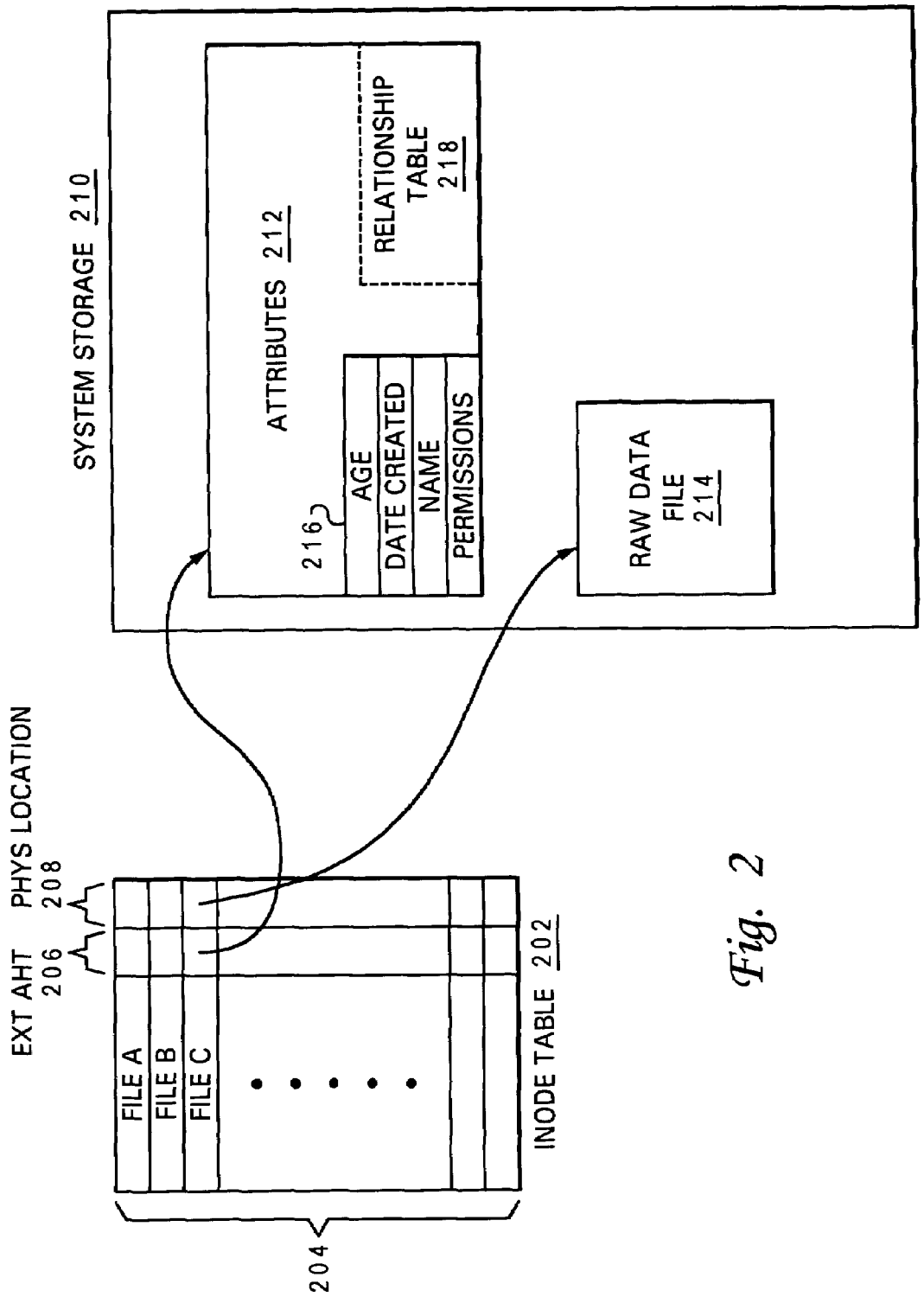
FIG. 2 is a graphical depiction of an inode table and its relationship to indexed files within the system memory of digital processing system 100, in accordance with a preferred embodiment of the present invention.

FIG. 2 is a graphical depiction of an inode table and its relationship to indexed files within the system storage of digital processing system 100, in accordance with a preferred embodiment of the present invention. Inode table 202 contains multiple file entries 204, which each represent an object contained in the digital processing system 100 file system. Inode table 202 includes an extended attribute column 206, which provides the location in system storage 210 of an extended attribute table for each file 204. Inode table 202 also includes column 208 providing the physical location within system storage 210 of raw data 214 for each file 204. For example, as shown in FIG. 2, the entry in column 206 for "File C" indicates the location of File C's external attributes table 212, and the physical location 208 indicates the location of File C's raw file data 214. Attribute table 212 is representative of all attribute tables used in the file system of digital processing system 100. System storage 210 contains multiple attribute tables 212 and raw data files 214 not shown in FIG. 2. Each attribute table 212 associated with a file 204 contains identifying attributes 216, which provide identifying information about the file, and a relationship table 218, which indicates the relationship between the associated file and any interdependent (also called co-requisite) files.

Figure 3:
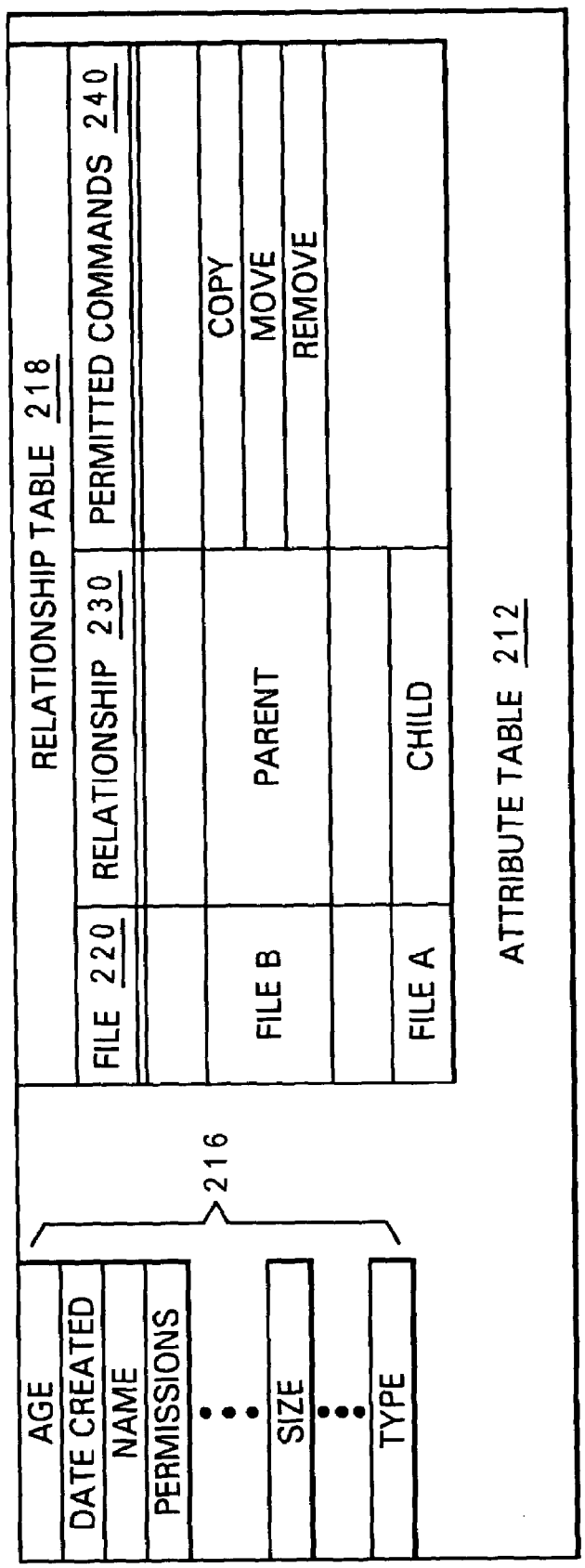
FIG. 3 is a graphical representation of an attribute table within a system file, in accordance with a preferred embodiment of the present invention.

With reference now to FIG. 3, there is depicted a graphical representation of attribute table 212 within a file, in accordance with a preferred embodiment of the present invention. The attributes 216 represent various identification attributes of the associated file, in this example File C. Such identification attributes of File C include its age, date created, name, permissions, size, type, etc. Also contained within extended attribute table 212 is the relationship table 218, which indicates the relationships between the original file and other files that are interdependent or co-requisite with the original file, and other control information associated with the co-requisite files.

The first column within relationship table 218 is column 220, which indicates certain of the co-requisite files for the file associated with attribute table 212. In this example, File C is shown to have two co-requisite files—File A and File B. Column 230 in relationship table 218 indicates the relationship between the table's associated file and the co-requisite files 220. As provided in a preferred embodiment, the relationship between co-requisite files can be equal or can be parent-child. In the example of FIG. 3, File C is shown to be a "parent" of File B and a "child" of File A. When a relationship is equal, actions done to one file will also be done to the related file. When a relationship is considered parent-child, actions done to the parent automatically are performed on the child, but actions performed on a child are not performed on a parent. The last column 240 in relationship table 218 indicates the commands or actions that when performed on the associated file to relationship table 218 are permitted to be performed on a file indicated in column 230 to be a child to the original file. In other words, column 240 indicates the commands that will be performed on a co-requisite file that is a child of the associated file to the table when those commands are performed on the associated file. For the example of FIG. 3, since File C is a parent of File B, those commands listed in column 240 that are performed on File C will also be performed on File B by the digital processing system 100. FIG. 3 shows that the permitted commands for File B are the "copy," "move," and "remove" commands. Thus, if the operating system performs a "copy," "move," or "remove" operation on File C, it will also perform those operations on File B. Since File C is shown to be a "child" of File A, any operations performed on File C are not automatically performed on File A by the system of the preferred embodiment (although the system may automatically perform the operation on File A for other purposes not described).

Figure 4:
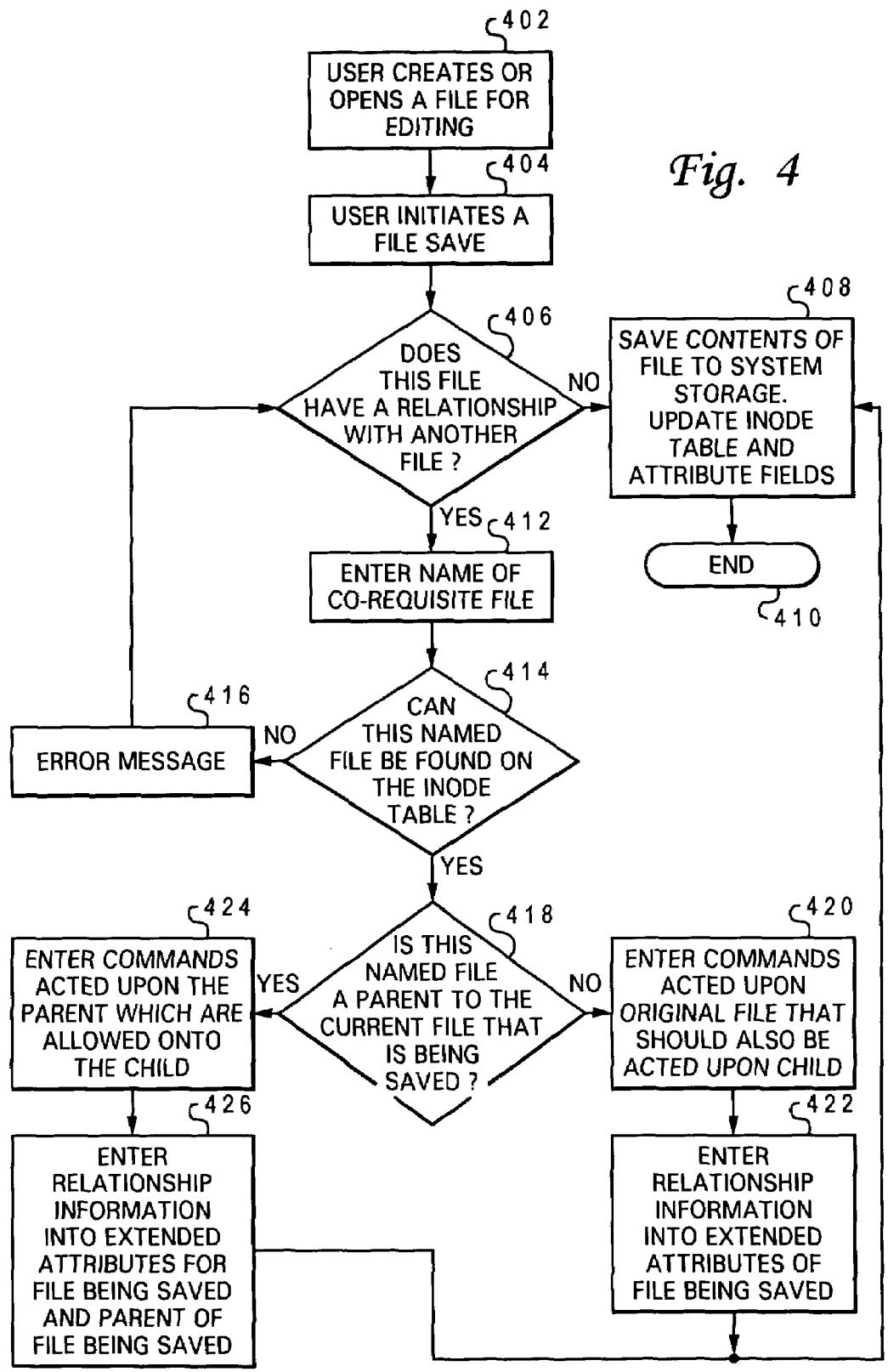
FIG. 4 is a simplified flow diagram of a process for creating a relationship table within an attribute table of a system file, in accordance with a preferred embodiment of the present invention.

With reference now to FIG. 4, there is shown a simplified flow diagram of a process for creating the relationship table within the attribute table of a system file, in accordance with a preferred embodiment of the present invention. The process starts at step 402, when a user creates or opens a file for editing within the computer system. At step 404, the user initiates a command to save the file that was created or edited. At step 406, it is determined whether the user or system wants to create an interdependent relationship between the created or edited file and another file within the file system (as used herein, files with such an interdependency are called co-requisite files). If not, the process passes to step 408, where the contents of the file are saved to memory and the inode and attribute tables are updated. Thereafter, the process terminates at step 410.

Returning to step 406, if it is determined that the created or edited file is co-requisite with another file within the file system, the process proceeds to step 412, where the name of the co-requisite file is entered by the user or provided by the operating system. At step 414, the inode table is searched for the named file entered at step 412, and it is determined if the named file is found. If the file cannot be found in the inode table, the process proceeds to step 416, where an error message is generated, and thereafter the process returns to step 406.

If the file named at step 412 is found in the inode table, the process proceeds from step 414 to step 418, where a determination is made whether the named file at step 412 is a parent of the file being saved. If the determination at step 418 is that the named filed at step 412 is not a parent to the file being saved, the process proceeds to step 420, where the user or system is prompted to provide the system commands, operations or actions that can be performed on the file being created or edited that should also be performed on its co-requisite, child files. At step 422, the co-requisite file names are entered in column 220, the parent-child relationships are entered in column 230, and the permitted commands for the co-requisite files are entered in column 240 of relationship table 218 stored in association with the original file being created or edited. The process then proceeds to step 408, where the raw data contents of the original file are saved in system memory, the attribute table 214 is saved in system memory, and the inode table, including its associated attribute fields, is updated in system memory. The process then terminates at step 410.

Returning to decision block 418, if it is determined that the file named at step 412 is a parent to the current file being saved, the process proceeds to step 424, where the user or system is prompted to provide the system commands, operations or actions that can be performed on the file being created or edited when those commands, operations or actions are performed on its co-requisite parent files. The process then proceeds to step 426, where the co-requisite file name is entered in column 220, the child relationship to the co-requisite file is entered in column 230, and the permitted commands for application to the current file being saved when performed on the co-requisite file are entered in column 240 of relationship table 218 stored in association with the original file being saved. Further at step 426, the attribute table 212 of the parent file named at step 412 is also updated to reflect the co-requisite file currently being saved. The process then proceeds to step 408, where the raw data contents of the original file are saved in system memory, the attribute table 214 is saved in system memory, and the inode table 202, including its associated attribute fields, is updated in system memory. The process then terminates at step 410.

From the user experience perspective, the process for creating the attribute table and linking the various co-requisite files begins as part of a file being saved by the user. As part of the same process, a question is asked of the user if they wish to set up a requisite relationship with any other files. If so, the program would ask the user to list the co-requisite files and the type of relationship between the interdependent files, such as a parent-child relationship. The program then goes to each file and updates its extended attributes to reflect the interdependent relationship of other co-requisite files. In an alternative embodiment, a linking program can be executed by the user that allows the user to generate an attribute table and associated relationship table between two existing files.

Figure 5:
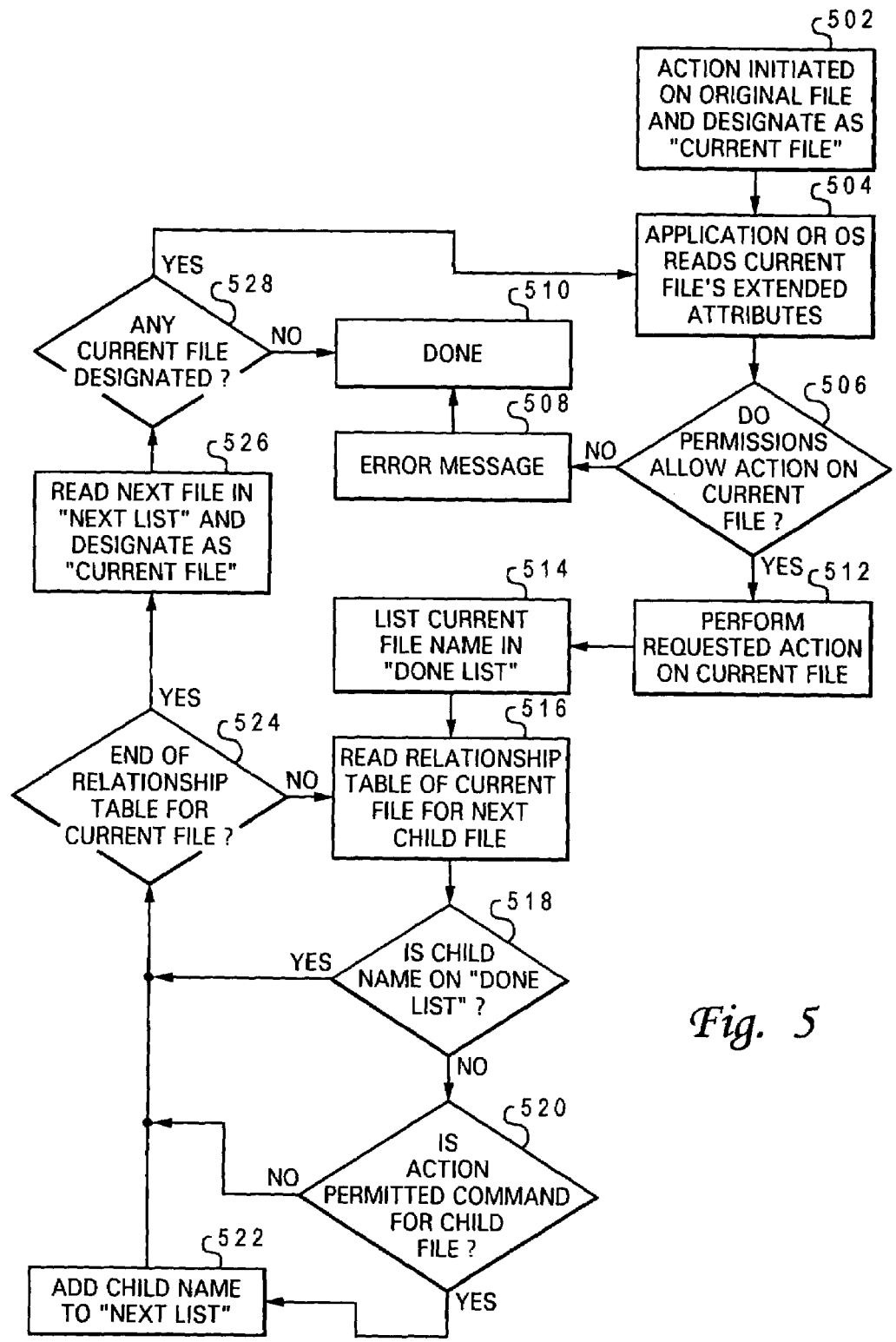
FIG. 5 is a flow diagram of a process for utilizing a relationship table and associated attributes of a system file to manage co-requisite files within a computer system, in accordance with the preferred embodiment of the present invention.

Now referring to FIG. 5, there is shown a flow diagram of a process for utilizing the relationship table and associated attributes to manage co-requisite files within a computer system, in accordance with the preferred embodiment of the present invention. The process starts at step 502, when an action is initiated by a user on a particular file containing an attribute table 212, as provided in the preferred embodiment of the present invention. At step 504, either an application executing on the computer system or the operating system (OS) for the computer system, opens the current file's extended attributes in the attribute table 212 to learn the particulars about the identity of the file and any relationships to co-requisite files. At step 506, the system determines whether the permissions listed in attributes 216 of attribute table 212 permit such an action to be initiated on the current file. If not, in some embodiments, the process issues an error message at step 508, and thereafter the process terminates at step 510. In alternative embodiments, the process may proceed directly to step 516, instead of step 510, when the action is not permitted on the parent, but it is desirable to still perform the action on appropriate co-requisite files of the current file. If the permissions do allow the action as indicated at step 506, the process proceeds to step 512, where the requested action is performed on the current file. At step 514, the acted-upon current file is listed in a "done list" that is created by the operating system within system memory to keep track of the implementation of actions performed on the original file and its co-requisite files.

At step 516 of FIG. 5, the relationship table 218 for the current file is read to determine the next file within column 230 indicated as a child of the current file. At step 518, a determination is made whether the child file read from the relationship table 218 for the current file is already listed in the "done list." If so, the process proceeds to step 524, where a determination is made whether there remains any child file listed within relationship table 218 for the current file that has not been read. If it is determined at step 518 that the child file is not on the "done list," the process proceeds to step 520, where it is determined whether the action is a permitted command for the child file, as indicated in column 240 of its relationship table 218. If not, the process proceeds to step 524, and if so, the process proceeds to step 522, where the child file name is added to a "next list" that is stored in memory to facilitate the process of the preferred embodiment. Thereafter, the process proceeds to step 524.

At step 524, a determination is made whether there remains any child file listed within relationship table 218 for the current file that has not been read. If the end of the relationship table has not been reached for the current file, the process returns to step 516, where the next child file in the relationship table for the current file is read. If the end of the relationship table has been reached for the current file, the process proceeds to step 526, where a next file entry in the "next list" is read from the system memory and it is designated as the "current file". The process proceeds to step 528, where a determination is made whether any files remained in the "next list" that have been designated the current file. If the end of the next list had been reached, the process proceeds to step 510 and terminates. If a next file in the next list has been designated the current file, the process returns to step 504 with the co-requisite file designated as the "current file", and thereafter the process proceeds to repeat the process on the "current file" until the process has iterated through each of the relationship tables for each of the child files listed in the "next list" until there are no longer any files listed in the "next list" and the process terminates at step 510.

From the user experience perspective, when an action is initiated on a file, such as when a file is copied, moved or attached to an e-mail, the file system within the computer extracts the header information from the file to obtain the extended attributes for the file. As part of this "open-to-learn" action, the extended attributes in the file's relationship table are examined to see if there is relationship to other co-requisite files within the system. If there is such a relationship, the names of the co-requisite files for the file are saved in temporary memory. The requested action is then performed on the original file. Thereafter, the temporary file of co-requisite files is used to perform the action on all co-requisite files that permit the action to be performed through this co-requisite action process.

In an alternative embodiment, the management of co-requisite files in accordance with principles of the invention may be implemented as a computer program-product for use with the computer system 100. The programs defining the functions of the preferred embodiment can be delivered to the computer system 100 and/or to the peripheral device for installation on a connected adapter via a variety of signal-bearing media or computer readable storage media, which include, but are not limited to: (a) information permanently stored on non-writable storage media, e.g., read only memory devices within either computer such as CD-ROM disks readable by CD-ROM; (b) alterable information stored on writable storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments. In the alternative, the function of figures could be implemented by control circuitry through the use of logic gate, programmable logic devices, or other hardware components in lieu of a processor-based system.

While the invention has been particularly shown and described with reference to a preferred embodiment, it will be understood by those skilled in the art that various changes in form and detail may be made therein without departing from the spirit and scope of the invention.

What is claimed is:

1. A method for managing files in a data processing system, said method comprising the steps of:
   in response to a command being initiated on a file:
      accessing one or more extended attribute fields that define attributes of the file, wherein the one or more extended attribute fields are contained in an attribute table that defines a hierarchical relationship between the file and one or more co-requisite files, the attribute table defining said hierarchical relationship as parent or child or same level, and wherein the attribute table specifies a set of one or more permitted commands for each hierarchical relationship defined as parent;
      responsive to the file being defined by the attribute table as same level with respect to one of the co-requisite files, performing the command on said one of the co-requisite files;
      responsive to the file being defined by the attribute table as child with respect to one of the co-requisite files, not performing the command on said one of the co-requisite files; and
      responsive to the file being defined by the attribute table as parent with respect to one of the co-requisite files, performing the command on said one of the co-requisite files only if the command is included in the specified set of one or more permitted commands.

2. The method for managing files in a data processing system according to claim 1, said method further comprising the step of:
   performing the command on the file.

3. The method for managing files in a data processing system according to claim 1, wherein the command is a transfer command for transferring the file from a memory of the data processing system.

4. The method for managing files in a data processing system according to claim 3, wherein the transfer command is a copy command.

5. The method for managing files in a data processing system according to claim 1, wherein the file is a markup language file.

6. A system for managing files in a data processing system, said system comprising:
   means responsive to a command being initiated on a file for:
      accessing one or more extended attribute fields that define attributes of the file, wherein the one or more extended attribute fields are contained in an attribute table that defines a hierarchical relationship between the file and one or more co-requisite files, the attribute table defining said hierarchical relationship as parent or child or same level, and wherein the attribute table specifies a set of one or more permitted commands for each hierarchical relationship defined as parent;
      responsive to the file being defined by the attribute table as same level with respect to one of the co-requisite files, performing the command on said one of the co-requisite files;
      responsive to the file being defined by the attribute table as child with respect to one of the co-requisite files, not performing the command on said one of the co-requisite files; and
      responsive to the file being defined by the attribute table as parent with respect to one of the co-requisite files, performing the command on said one of the co-requisite files only if the command is included in the specified set of one or more permitted commands.

7. The system for managing files in a data processing system according to claim 6, said system further comprising:
   means for performing the command on the file.

8. The system for managing files in a data processing system according to claim 6, wherein the command is a transfer command for transferring the file from a memory of the data processing system.

9. The system for managing files in a data processing system according to claim 8, wherein the transfer command is a copy command.

10. The system for managing files in a data processing system according to claim 6, wherein the file is a markup language file.

11. An article of manufacture for managing objects in a data processing system, the article of manufacture comprising tangible computer readable storage media including program logic embedded therein that causes control circuitry to perform the steps of:
    in response to a command being initiated on a file:
       accessing one or more extended attribute fields that define attributes of the file, wherein the one or more extended attribute fields are contained in an attribute table that defines a hierarchical relationship between the file and one or more co-requisite files, the attribute table defining said hierarchical relationship as parent or child or same level, and wherein the attribute table specifies a set of one or more permitted commands for each hierarchical relationship defined as parent;
       responsive to the file being defined by the attribute table as same level with respect to one of the co-requisite files, performing the command on said one of the co-requisite files;
       responsive to the file being defined by the attribute table as child with respect to one of the co-requisite files, not performing the command on said one of the co-requisite files; and
       responsive to the file being defined by the attribute table as parent with respect to one of the co-requisite files, performing the command on said one of the co-requisite files only if the command is included in the specified set of one or more permitted commands.

12. The article of manufacture of claim 11, further comprising program logic embedded therein that causes control circuitry to perform the steps of:
    performing the command on the file.

13. The article of manufacture of claim 11, wherein the command is a transfer command for transferring the file from a memory of the data processing system.

14. The article of manufacture of claim 11, wherein the file is a markup language file.

* * * * *